US011961261B2

(12) United States Patent
Li et al.

(10) Patent No.: US 11,961,261 B2
(45) Date of Patent: Apr. 16, 2024

(54) AI-BASED AESTHETICAL IMAGE MODIFICATION

(71) Applicant: Microsoft Technology Licensing, LLC, Redmond, WA (US)

(72) Inventors: Ji Li, San Jose, CA (US); Xiao Sun, Beijing (CN); Qi Dai, Beijing (CN); Han Hu, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 349 days.

(21) Appl. No.: 17/514,836

(22) Filed: Oct. 29, 2021

(65) Prior Publication Data
US 2023/0134337 A1    May 4, 2023

(51) Int. Cl.
*G06T 7/00* (2017.01)
*G06N 20/20* (2019.01)
*G06T 3/40* (2006.01)
*G06T 7/11* (2017.01)

(52) U.S. Cl.
CPC ............... *G06T 7/97* (2017.01); *G06N 20/20* (2019.01); *G06T 3/40* (2013.01); *G06T 7/11* (2017.01);
(Continued)

(58) Field of Classification Search
CPC ...... G06V 10/24; G06V 10/945; G06F 16/58; G06F 16/9536; H04N 1/00307; G06T 2207/10016
See application file for complete search history.

(56) References Cited

U.S. PATENT DOCUMENTS 6,567,563 B2 * 5/2003 Shin .................... H04N 1/0005
                                                     382/249
6,850,252 B1 * 2/2005 Hoffberg ............. H04N 21/475
                                                     380/252
(Continued)

FOREIGN PATENT DOCUMENTS

CN    112017193 A    12/2020

OTHER PUBLICATIONS

Zeng, et al., "Reliable and Efficient Image Cropping: A Grid Anchor based Approach", In Proceedings of the IEEE/CVF Conference on Computer Vision and Pattern Recognition (CVPR), Jun. 15, 2019, pp. 5949-5957.
(Continued)

Primary Examiner — Yosef Kassa
(74) Attorney, Agent, or Firm — NovoTechIP International PLLC

(57) ABSTRACT

A scheme for modifying an image is disclosed, which includes receiving a source image having a first image configuration; determining a second image configuration for a target image; providing the received source image to an AI engine trained to identify, based on a set of rules related to visual features, candidate regions from the source image; generating proposal images based on the candidate regions, respectively; determining, based on prior aesthetical evaluation data, an aesthetical value of each regional proposal image; and selecting, based on the determined aesthetical value of each regional proposal image, one of the regional proposal images as the target image; extracting, from the AI engine, the target image; and causing the target image to be displayed via a display of a user device.

20 Claims, 16 Drawing Sheets

(52) U.S. Cl.
CPC .............. *G06T 2207/20081* (2013.01); *G06T 2207/20132* (2013.01)

(56) References Cited

U.S. PATENT DOCUMENTS

| | | | | |
|---|---|---|---|---|
| 7,813,822 | B1* | 10/2010 | Hoffberg | ................ H04N 7/163 381/73.1 |
| 7,966,078 | B2* | 6/2011 | Hoffberg | ................ G06F 3/048 370/200 |
| 8,503,791 | B2* | 8/2013 | Conwell | ............ H04N 1/00307 707/731 |
| 8,516,266 | B2* | 8/2013 | Hoffberg | ................ G05B 15/02 715/239 |

OTHER PUBLICATIONS

Christensen, et al., "An Experience-Based Direct Generation Approach to Automatic Image Cropping", In Journal of IEEE Access, vol. 9, Jul. 28, 2021, pp. 107600-107610.
Li, et al., "Learning to Learn Cropping Models for Different Aspect Ratio Requirements", In Proceedings of the IEEE/CVF Conference on Computer Vision and Pattern Recognition, Jun. 13, 2020, pp. 12685-12694.
"International Search Report and Written Opinion Issued in PCT Application No. PCT/US22/042821", dated Jan. 13, 2023, 12 Pages.
"Magically Resize your Designs in No Time with Canva Pro", Retrieved from: https://www.canva.com/q/pro/magic-resize/, Retrieved Date: Jan. 9, 2023, 5 Pages.

\* cited by examiner

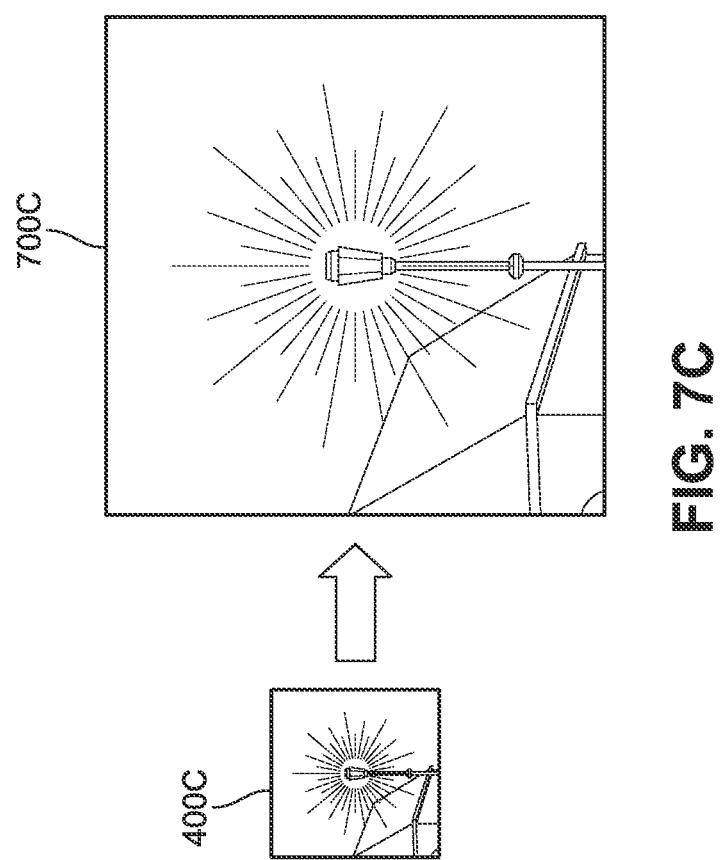

AI-BASED AESTHETICAL IMAGE MODIFICATION

BACKGROUND

The recent development in digital photography has revolutionized how visual content is created, published, shared and consumed, and has contributed to the births and successes of a number of significant visual content-based social networking services, such as, Instagram™, TikTok™, etc. Now it has become a norm for anyone with a mobile device or digital camera to create, modify, store and share pictures and videos through various IT and social platforms. However, different content-related platforms require or impose different image configuration requirements and restrictions. Even within the same platform, different image configuration requirements and restrictions are often imposed depending on service or function types. For example, within the same Instagram™ platform, Instagram™ photo posts are automatically modified to have one image configuration (e.g., 1080×1080 pixels) while photos uploads for Instagram™ stories are automatically modified to have a different image configuration (e.g., 1080×1920 pixels). Due to such differences among different requirements and usage scenarios, a visual content created to meet one requirement or usage scenario may not be as aesthetically pleasing or visually effective as the original content when used for other usage scenarios. Hence, when the same visual content or source content is to be used for different usage scenarios (e.g., a magazine page, webpage banner, Facebook™ post, email template, newspaper advertisement, etc.), a user must manually modify the source content to generate a number of different variations manually to ensure that each variation meets different configuration requirements or restrictions while maintaining the same or similar aesthetical value or visual effectiveness. This requires human intelligence, training, skill and efforts, which cannot be easily replicated even with a state-of-art machine.

SUMMARY

In an implementation, a system for modifying an image, including a processor and a computer-readable medium in communication with the processor. The computer-readable medium including instructions that, when executed by the processor, cause the processor to control the system to perform functions of receiving a source image having a first image configuration; determining a second image configuration for a target image; providing, to an artificial intelligence (AI) engine, the received source image, the AI engine trained to perform functions of identifying, based on a set of rules related to visual features, a plurality of candidate regions from the source image, each candidate region showing a different portion of the source image; generating a plurality of regional proposal images based on the plurality of identified candidate regions, respectively, wherein each proposal region image has the second image configuration; determining, based on prior aesthetical evaluation data, an aesthetical value of each regional proposal image; and selecting, based on the determined aesthetical value of each regional proposal image, a first regional proposal image as the target image, the first region proposal image being one of the plurality of regional proposal images; extracting, from the AI engine, the first regional proposal image selected as the target image; and causing the first regional proposal image to be displayed via a display of a user device.

In another implementation, a method of operating a system for modifying an image includes receiving a source image having a first image configuration; determining a second image configuration for a target image; providing, to an artificial intelligence (AI) engine, the received source image, the AI engine trained to perform functions of identifying, based on a set of rules related to visual features, a plurality of candidate regions from the source image, each candidate region showing a different portion of the source image; generating a plurality of regional proposal images based on the plurality of identified candidate regions, respectively, wherein each proposal region image has the second image configuration; determining, based on prior aesthetical evaluation data, an aesthetical value of each regional proposal image; and selecting, based on the determined aesthetical value of each regional proposal image, a first regional proposal image as the target image, the first region proposal image being one of the plurality of regional proposal images; extracting, from the AI engine, the first regional proposal image selected as the target image; and causing the first regional proposal image to be displayed via a display of a user device.

In another implementation, a non-transitory computer-readable medium including instructions that, when executed by a processor, cause the processor to control a system to perform receiving a source image having a first image configuration; determining a second image configuration for a target image; providing, to an artificial intelligence (AI) engine, the received source image, the AI engine trained to perform functions of identifying, based on a set of rules related to visual features, a plurality of candidate regions from the source image, each candidate region showing a different portion of the source image; generating a plurality of regional proposal images based on the plurality of identified candidate regions, respectively, wherein each proposal region image has the second image configuration; determining, based on prior aesthetical evaluation data, an aesthetical value of each regional proposal image; and selecting, based on the determined aesthetical value of each regional proposal image, a first regional proposal image as the target image, the first region proposal image being one of the plurality of regional proposal images; extracting, from the AI engine, the first regional proposal image selected as the target image; and causing the first regional proposal image to be displayed via a display of a user device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 7A, 7B and 7C illustrate examples of modifying the plurality of extracted candidate regions to generate a plurality of regional proposal images.

DETAILED DESCRIPTION

Figure 1:
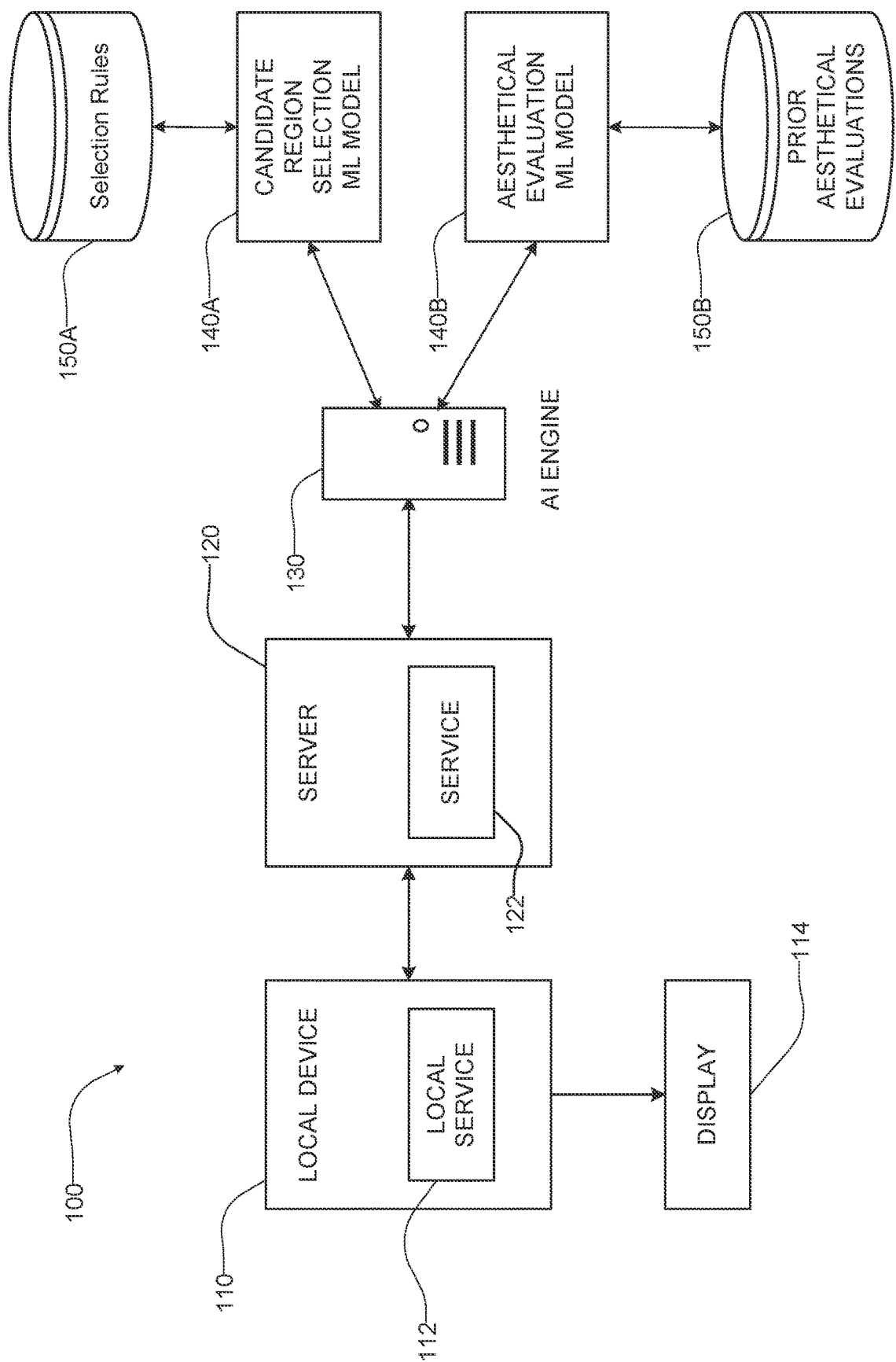
FIG. 1 illustrates an example system configured to modify a source image to generate a target image.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

When an existing image is to be used for posting, sharing, publishing, transmitting, etc., the image is very often modified or edited to meet image configurational requirements or guidelines imposed or suggested by an online or offline content sharing, printing or publishing service or platform. Such requirements or guidelines often vary platform to platform, service to service even in the same platform, function to function even in the same service, etc. Hence, the user must manually modify the image to meet the configuration requirements or restrictions. In doing so, the user also has to consider how to retain the same or similar aesthetical value or visual effectiveness in the modified image, which requires human intelligence, training, skill and efforts, which cannot be easily replicated even with a state-of-art machine. Hence, the image has to be manually edited and modified by the user, which may be time consuming and may not result in the best outcome.

This description is directed to having an artificial intelligence (AI) engine modify an image to have any desired image configuration (e.g., size, shape, etc.) while retaining or even improving the aesthetical value, providing a technical solution to the technical problems. A source image having an original configuration is received, and a target configuration, to which the source configuration is converted, is determined. Then, using an AI engine, the source image is modified to have the target configuration. In doing so, the AI engine identifies, based on a set of rules related to visual features, a plurality of candidate regions from the source image. Each candidate region shows a different but important portion of the source image. Based on the plurality of identified candidate regions, the AI engine generates a plurality of regional proposal images by, for example, resizing, cropping or warping the candidate regions, or adding a new portion to an existing candidate region such that each proposal region image has the target image configuration. Then, the AI engine determines, based on prior aesthetical evaluation data, an aesthetical value of each regional proposal image, ranks the regional proposal images based on their aesthetical values, and selects one of the regional proposal images having the highest aesthetical value as a target image. The target image is then extracted from the AI engine, and displayed via a display of a user device. As such, it becomes possible to generate, based on a single source image, a tailor-made image having a required or desired size or shape with the highest possible aesthetical value can be automatically and promptly created by the AI engine and presented to a user, and the user can use such images in any usage scenarios without any training or skills.

With this overview, attention is now turned to the figures to described various implementations of the presenting teachings.

FIG. 1 illustrates an example system 100 configured to modify a source image to have a different image configuration (e.g., size, shape, etc.) and a high aesthetical value. The term "aesthetical value" refers to a quantified degree of how aesthetically pleasing or satisfying an image is. Such aesthetical value on the same image may differ person to person, but tends to converge to a certain value when evaluated by a large group of people. When no collective consensus is observable from the evaluations by a large group of people, an average evaluation value may be used to determine the aesthetical value. The system 100 may include a local device 110, a server 120, an artificial intelligent (AI) engine 130, one or more machine learning (ML) model (e.g., a candidate region selection ML model 140A, aesthetical evaluation ML model 140B, etc.), and/or the like. The ML models 140A, 140B, etc. are collectively referred to as "ML models 140" hereinafter.

The local device 110 is representative of any physical or virtual computing system, device, or collection thereof, such as a smart phone, laptop computer, desktop computer, hybrid computer, tablet computer, gaming machine, smart television, entertainment device, Internet appliance, virtual machine, wearable computer, as well as any variation or combination thereof. The local device 110 may operate remotely from the server 120, and hence may communicate with each other by way of data and information exchanged over a suitable communication link or links. The local device 110 may implement some of or all the functions for aesthetically modifying a source image for a user of the local device 110. The local device 110 may also include or be in communication with the AI engine 130, ML models 140, etc.

The local device 110 may host a local service 112 configured to perform some of or all the functions for modifying a source image to have a different image configuration (e.g., size, shape, etc.) and a high aesthetical value. The local service 112 is representative of any software application, module, component, or collection thereof, capable of providing visual enhancement suggestions. The local service 112 may operate independently from or as part of a software tool (e.g., web browser, content creation software, photo editing software, publishing software, word processing software, presentation software, web development software, blog software, graphic design software, etc.) for creating visual contents (e.g., photos, documents, presentations, postcards, calendars, menus, templates, notifications, web pages, blog postings, advertisements, public relations (PR)/promotion materials, etc.) or uploading or sharing such visual contents via one or more platforms, services, functions, etc. The local device 110 may include or be connected to a display 114, which may display a graphical user interface (GUI) for the local service 112 or the software tool.

In an implementation, the local service 112 may be implemented as a locally installed and executed application, streamed application, mobile application, or any combination or variation thereof, which may be configured to carry out operations or functions related to modifying a source image to have a different image configuration and a high aesthetical value. Alternatively, the local service 112 may be implemented as part of an operating system (OS), such as Microsoft™ Windows™, Apple™ iOS™, Linux™, Google™ Chrome OS™, etc. The local service 112 may be implemented as a standalone application or may be distributed across multiple applications.

The server 120 is representative of any physical or virtual computing system, device, or collection thereof, such as, a web server, rack server, blade server, virtual machine server, or tower server, as well as any other type of computing system, which may, in some scenarios, be implemented in a data center, a virtual data center, or some other suitable facility. The server 120 may operate an image modification service 122, which may implement all or portions of the functions for modifying a source image to have a different image configuration (e.g., size, shape, etc.) while retaining a high aesthetical value. The service 122 may host, be integrated with, or be in communication with various data sources and processing resources, such as, the ML models 140, one or more data storages (e.g., selection rules 150A, prior aesthetic evaluations 150B, etc.), and/or the like. The data storages 150A, 150B, etc. are collectively referred to as "data storages 150" hereinafter.

The service 122 may be any software application, module, component, or collection thereof capable of modifying a source image to have a different image configuration (e.g., size, shape, etc.) and a high aesthetical value and providing such modified image to the local service 112. In some cases, the service 122 is a standalone application carrying out various operations related to functions for modifying a source image to have a different image configuration (e.g., size, shape, etc.) and a high aesthetical value.

The features and functionality provided by the local service 112 and service 122 may be co-located or even integrated as a single application. In addition to the above-mentioned features and functionality available across application and service platforms, aspects of the aesthetical image modification functions may be carried out across multiple devices on a same or different computing devices. For example, some functionality for the aesthetical image modification functions may be provided by the local service 112 on the local device 10 and the local service 112 may communicate by way of data and information exchanged between with the server 120 or other devices. As another example, the local device 110 may operate as a so-called "thin client" in a virtual computing environment and receive video data that is to be displayed via the display 114. In this virtual computing scenario, the server 120 may carry out the entire aesthetical image modification functions.

To carry out the aesthetical image modification functions, the server 120 may include or be in communication with the AI engine 130. The AI engine 130 may include or be in communication with ML models 140, data storages 150, and/or the like. The AI engine 140 and ML models 140 and 150 may be implemented based on a machine-learning (ML), which generally involves various algorithms that can automatically learn over time. The foundation of these algorithms is generally built on mathematics and statistics that can be employed to predict events, classify entities, diagnose problems, and model function approximations. As an example, the candidate region selection ML model 140A (hereinafter "selection model 140A") may be trained to identify a plurality of candidate regions from a source image based on a set of rules related to visual features stored in, for example, the data storage 150A, etc. The aesthetical evaluation ML module 140B may be trained to determine associations between various datapoints and make decisions based on the patterns and associations in the prior aesthetic evaluations stored in the data storage 150B, etc. Such determination may be made following the accumulation, review, and/or analysis of data from a large number of users over time, that may be configured to provide the ML algorithm (MLA) with an initial or ongoing training set.

In different implementations, a training system may be used that includes an initial ML model (which may be referred to as an "ML model trainer") configured to generate a subsequent trained ML model from training data obtained from a training data repository. The generation of this ML model may be referred to as "training" or "learning." The training system may include and/or have access to substantial computation resources for training, such as a cloud, including many computer server systems adapted for machine learning training. In some implementations, the ML model trainer may be configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network.

Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced. The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

Figure 2:
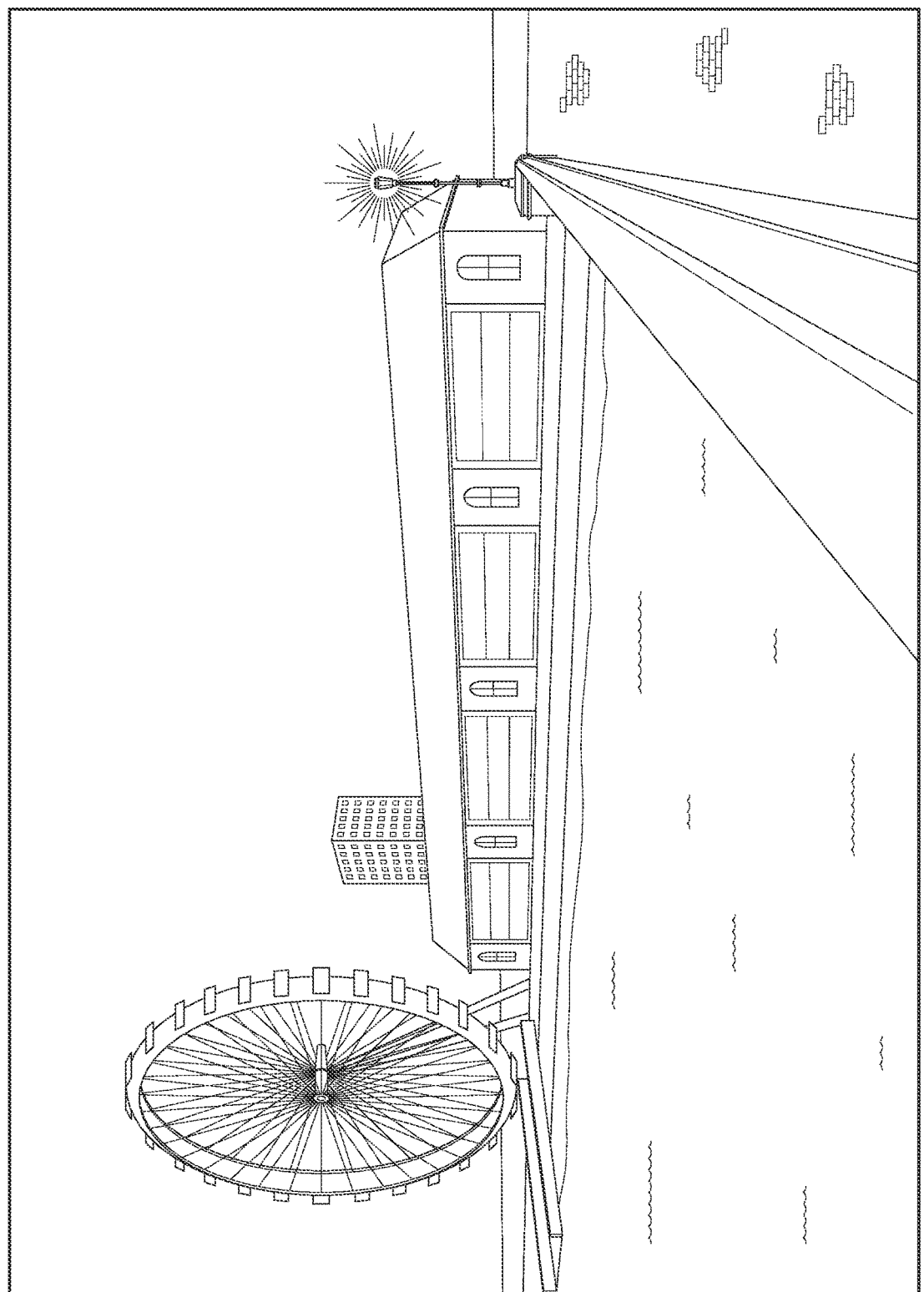
FIG. 2 illustrates an example source image.
Figure 3A:
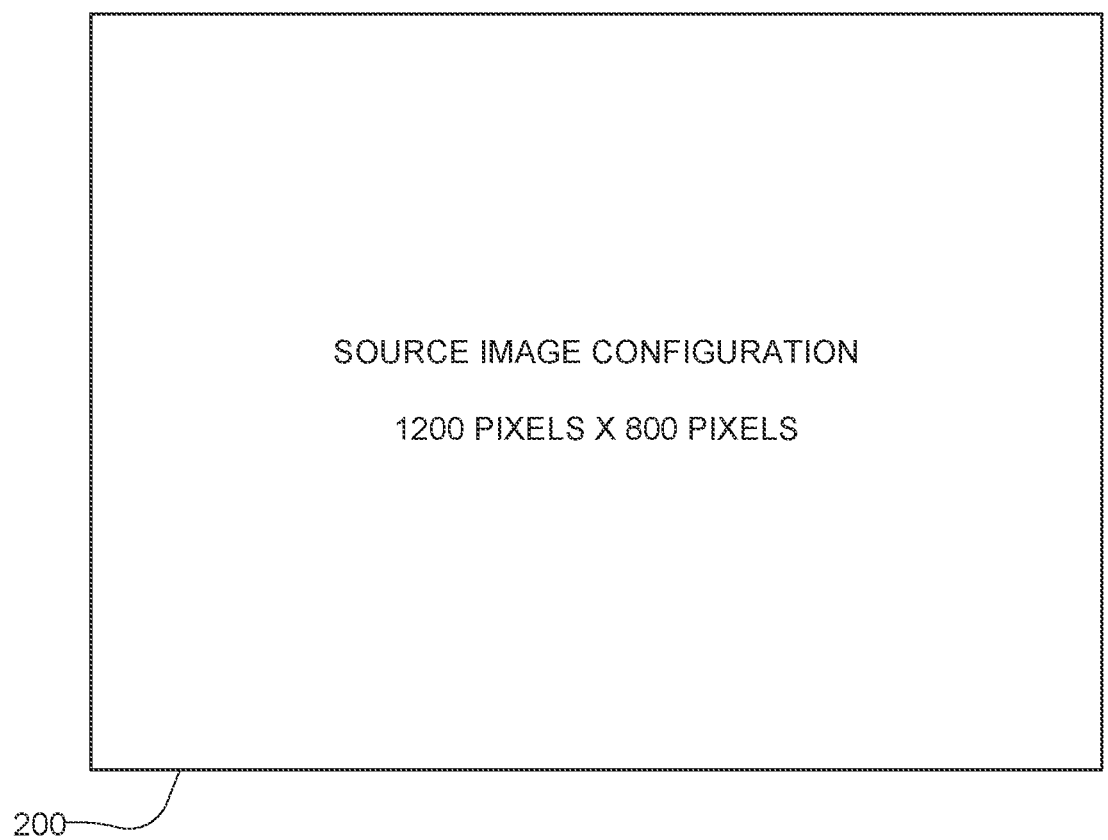
FIGS. 3A and 3B illustrate example configurations of the source and target images.
Figure 3B:
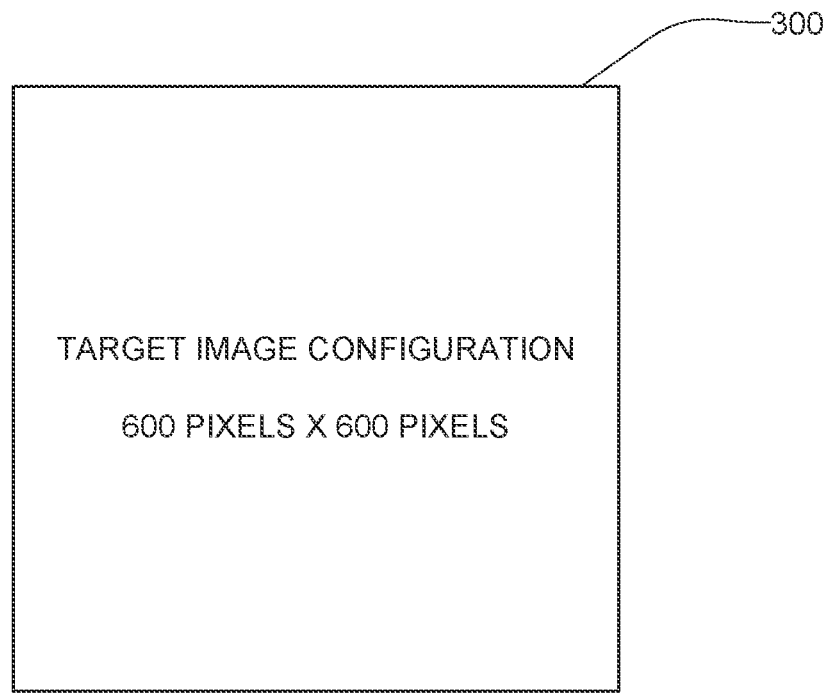

FIG. 2 illustrates an example source image 200, which may be a picture taken by the user of the local device 110, downloaded from a website, available from a software application, etc. FIG. 3A illustrates an example rectangular-shaped original configuration of the source image 200 may be, for example, 1200 pixels by 800 pixels. The system 100 may be configured to modify the source image to have a new image configuration different from the original image configuration, which is referred to as a target image configuration hereinafter. FIG. 3B illustrates an example square-shaped configuration for a target image 300, which may be, for example, 600 pixels by 600 pixels. As such, at least one of the height and width of the target image 300 may be different from at least one of the height and width of the source image 200.

The system 100 may then determine the target image configuration. The target image configuration may be provided by the user or stored in a data storage. For example, when the user wishes to modify the source image 200 to upload to his or her Facebook™ page, the user may enter an image configuration optimized for a Facebook™ post (e.g., 1200 pixels by 788 pixels) as the target image configuration. The system 100 may also store various target image configurations that are required or optimized for different platforms, services and functions. Such target image configuration may be automatically identified and applied when the user selects a particular platform, service or function or the user is using the part particular platform, service or function. For example, when the system 100 detects that the user is browsing a Facebook™ website, using a Facebook™ application, etc., the system 100 may automatically apply the image configuration optimized for a Facebook™ post as the target image configuration. The system 100 may also be configured to perform an online search to determine the new image configuration when the new image configuration is readily available to the user or the system 100.

Upon receiving the source image 200 and identifying the target image configuration, the system 100 may identify, from the source image 200, a plurality of candidate regions 400 based on a set of rules related to visual features. Each of the candidate regions 400 may show a different portion of the source image 200 although some of the candidate regions 400 may at least partially overlap each other. In certain circumstances, one of the candidate regions 400 may be entirely located with another candidate region.

Figure 4:
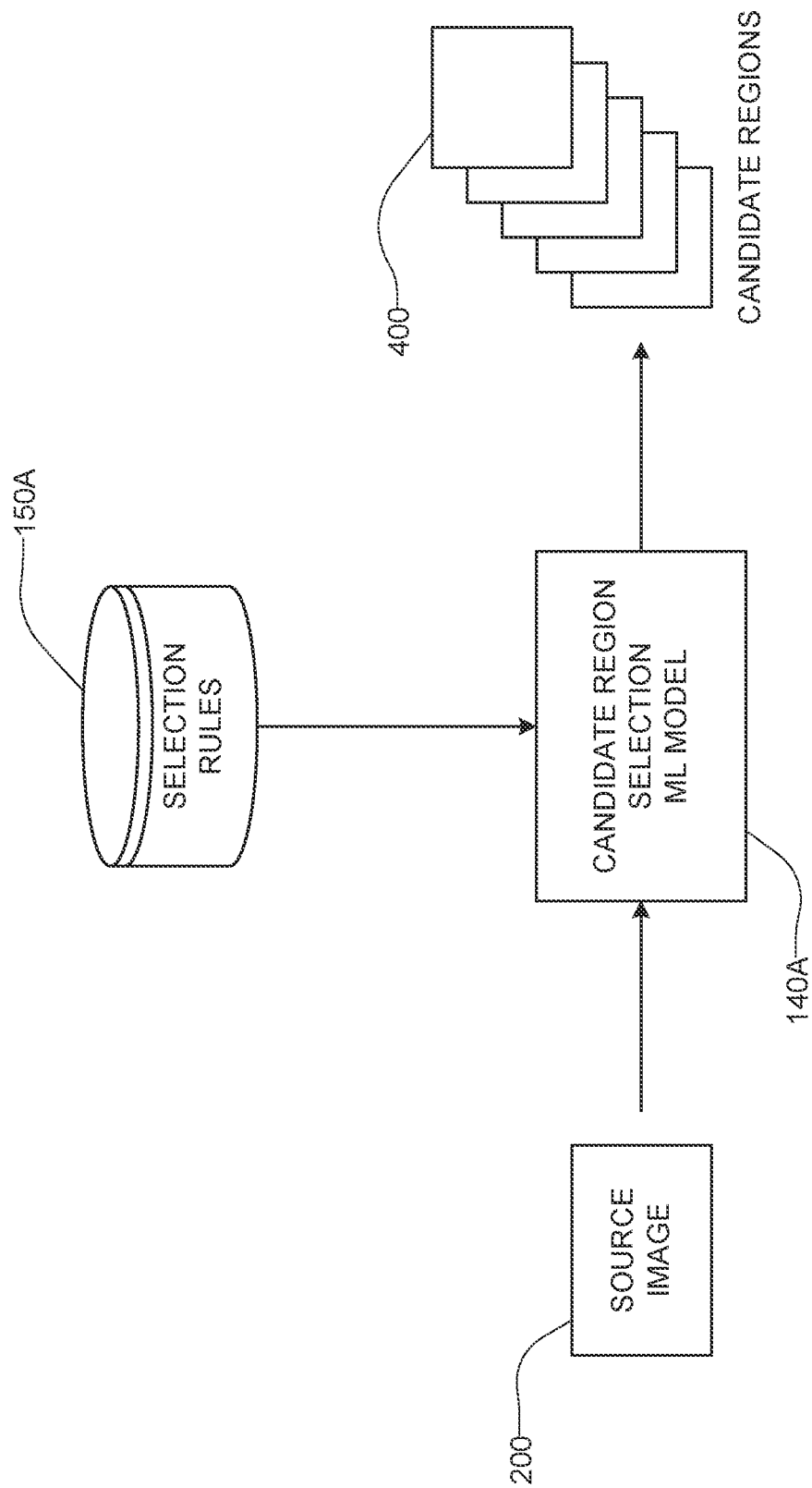
FIG. 4 illustrates example operations of a candidate region selection machine learning (ML) model.

In an implementation, the candidate regions 400 may be identified by the selection model 140A. FIG. 4 illustrates example operations of the selection model 140. The selection model 140A may be trained to select the candidate regions 400 based on a set of rules related to visual features stored in the data storage 150A. The stored set of rules may include the identified second image configuration, an aspect ratio or shape of the source image 200 or target image 300, a location of text in the source image 200, a location of a logo in the source image 200, a location of a specific body part in the source image 200, a predetermined visibility tolerance, a predetermined clarity or distortion tolerance, etc. For example, when the source image 200 prominently shows an object (e.g., a person, logo, etc.), the set of rules may indicate that each candidate region 400 should show at least a portion of the source image 200 showing the object.

Figure 5:
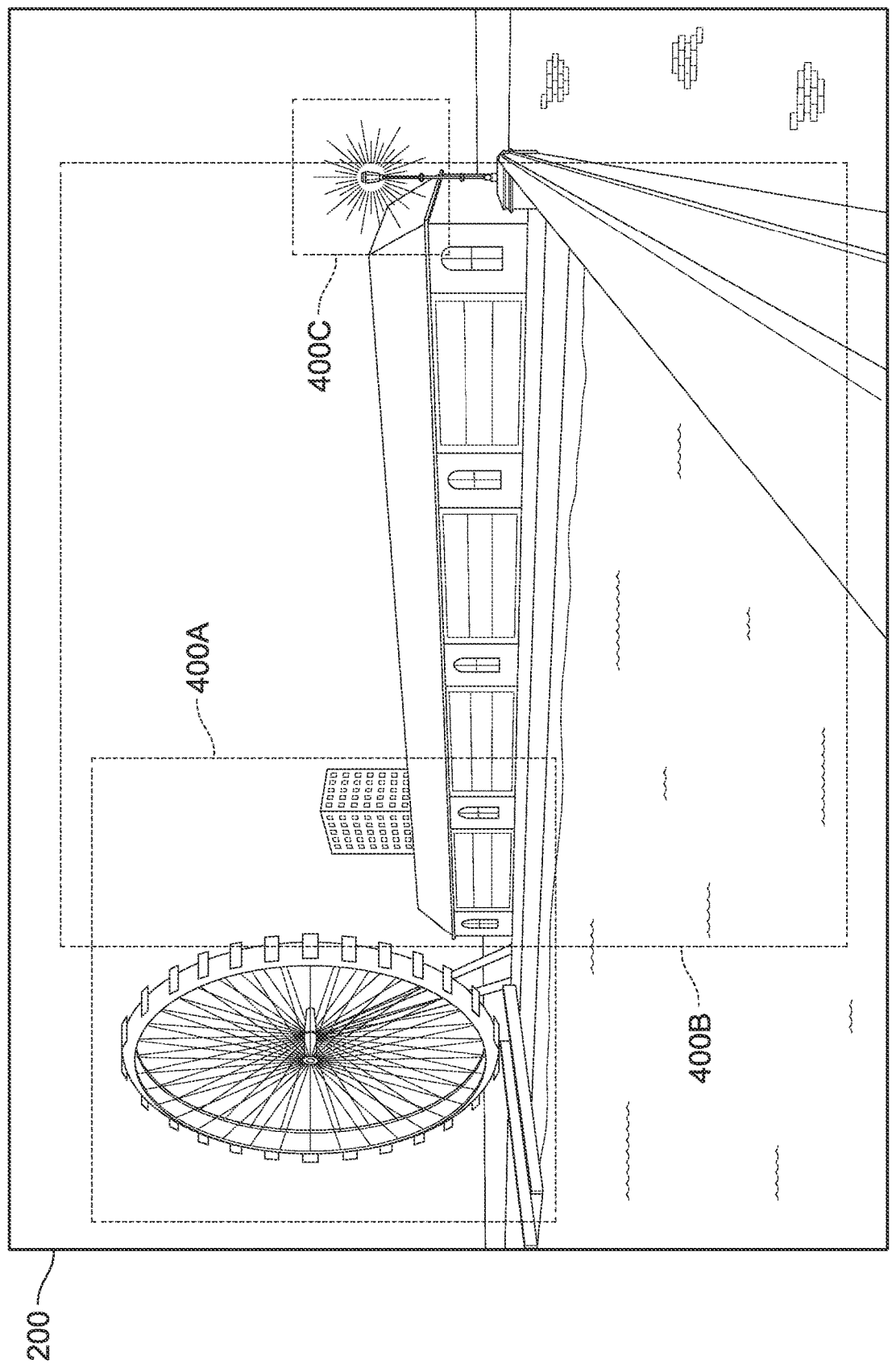
FIG. 5 illustrates example shapes, sizes and locations of a plurality of candidate regions on the source image.
Figure 6B:
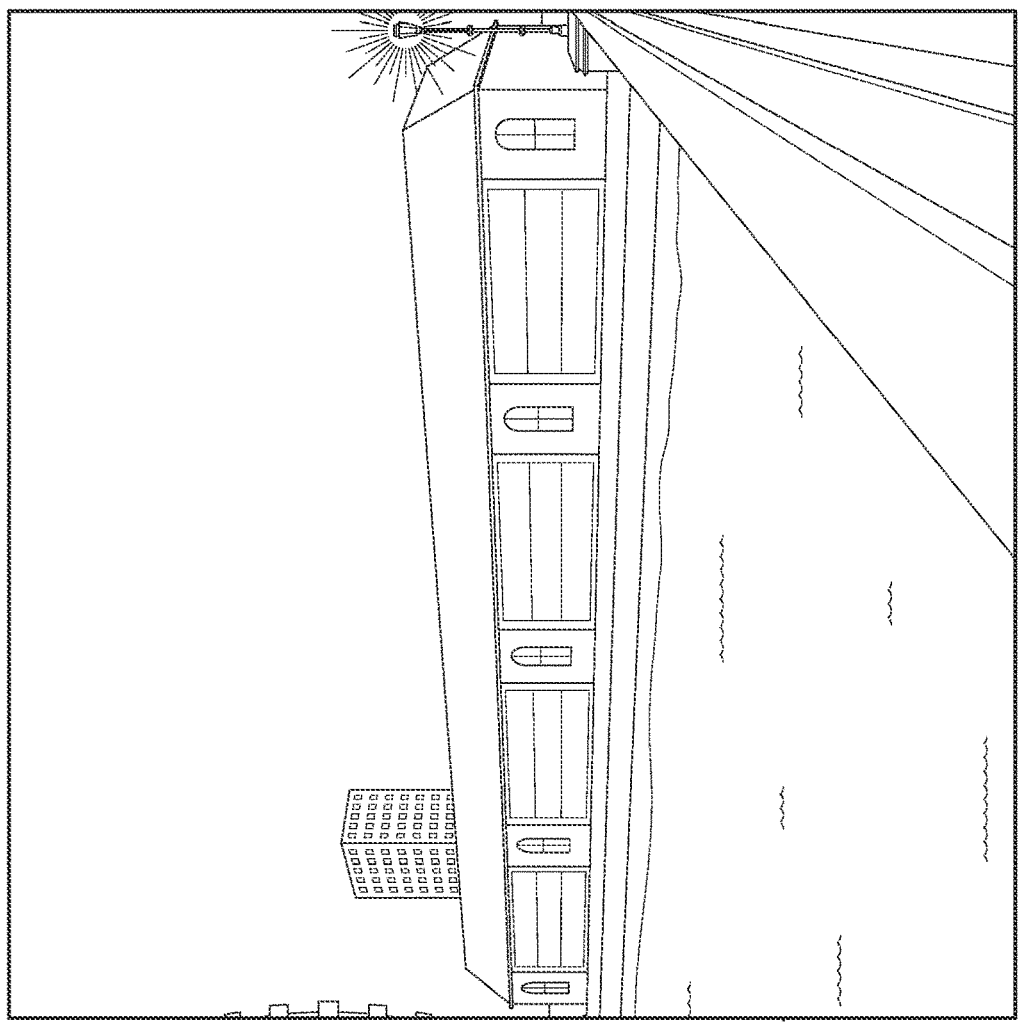
FIGS. 6A, 6B and 6C illustrate the plurality of candidate regions extracted from the source image.
Figure 6A:
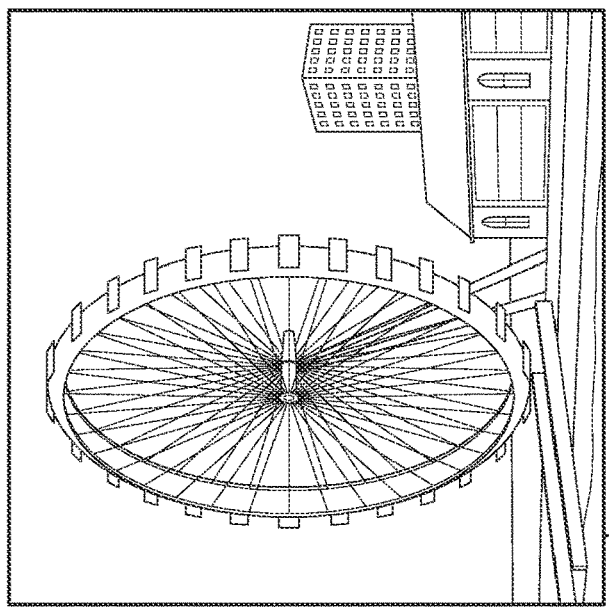
Figure 6C:
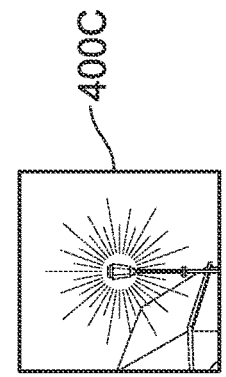

FIG. 5 illustrates example candidate regions 400A, 400B and 400C, which are selected as the source image 200 based on the set of rules. The candidate regions 400A, 400B and 400C are collectively referred to as the candidate regions 400 hereinafter. The selection model 140A may select the candidate regions 400A, 400B and 400C for prominently showing a carnival ride, a traditional architecture, and a flare from a lamp, respectively. FIGS. 6A, 6B and 6C illustrate the candidate regions 400 extracted from the source image 200. As shown in FIGS. 5 and 6, the candidate regions 400 may not be required to have the same configuration as the target image configuration, and portions of the source image 200 that are different from the target image configuration may be selected as the candidate regions 400. For example, portions of the source image 200 that are substantially larger or smaller than the target image configuration may be selected as the candidate regions. When such substantially larger or smaller portions are resized to have the same image configuration as the target image configuration, the object shown in the portions may become too small, blurry or distorted. Hence, the set of rules may define the visibility, clarity and distortion tolerances to avoid selecting unusable portions of the source image 200 as the candidate regions. For example, depending on a resolution/clarity of the source image 200, the set of rules may prohibit each candidate region 400 to be smaller or larger than a predetermined size.

Figure 7A:
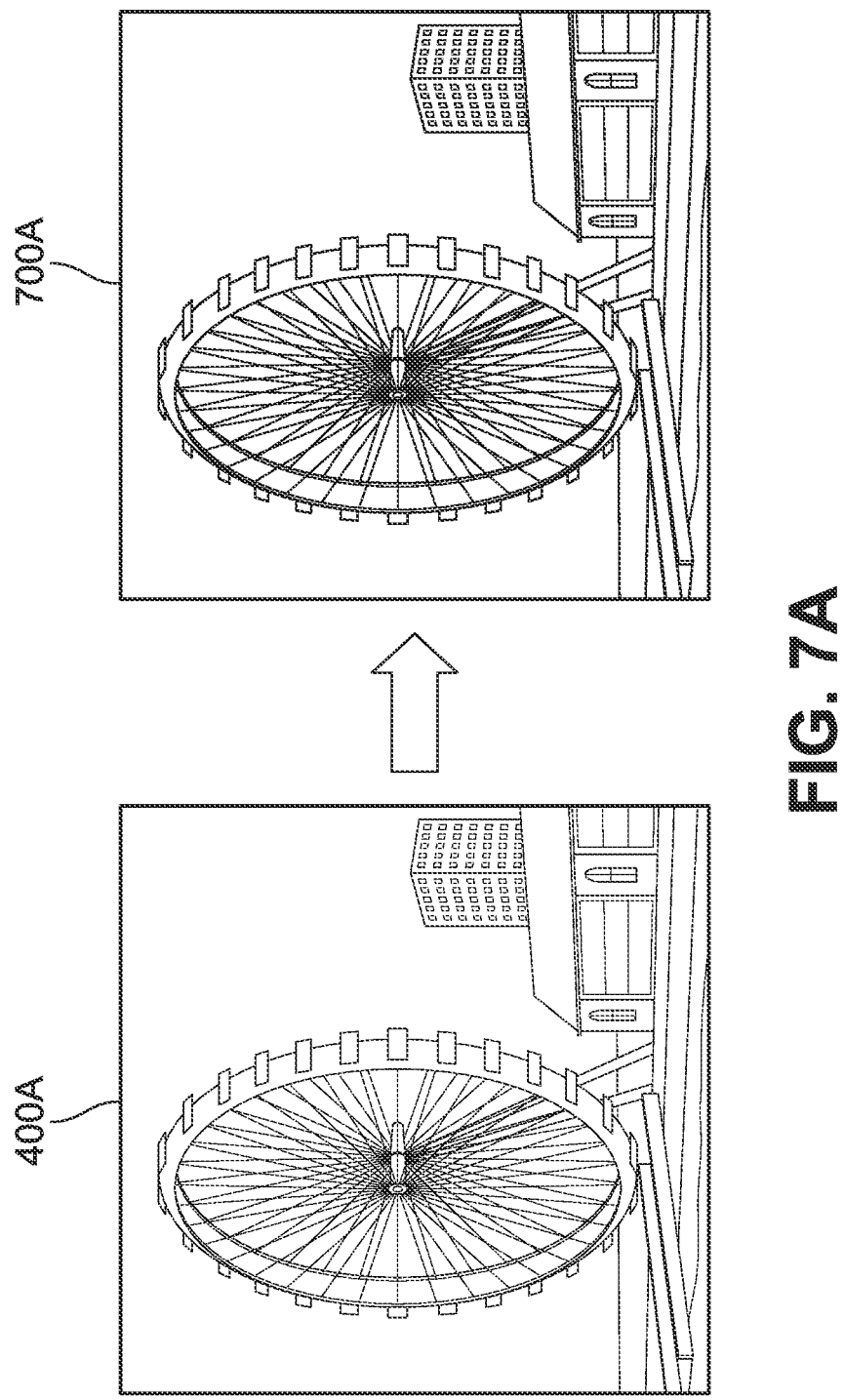
Figure 7B:
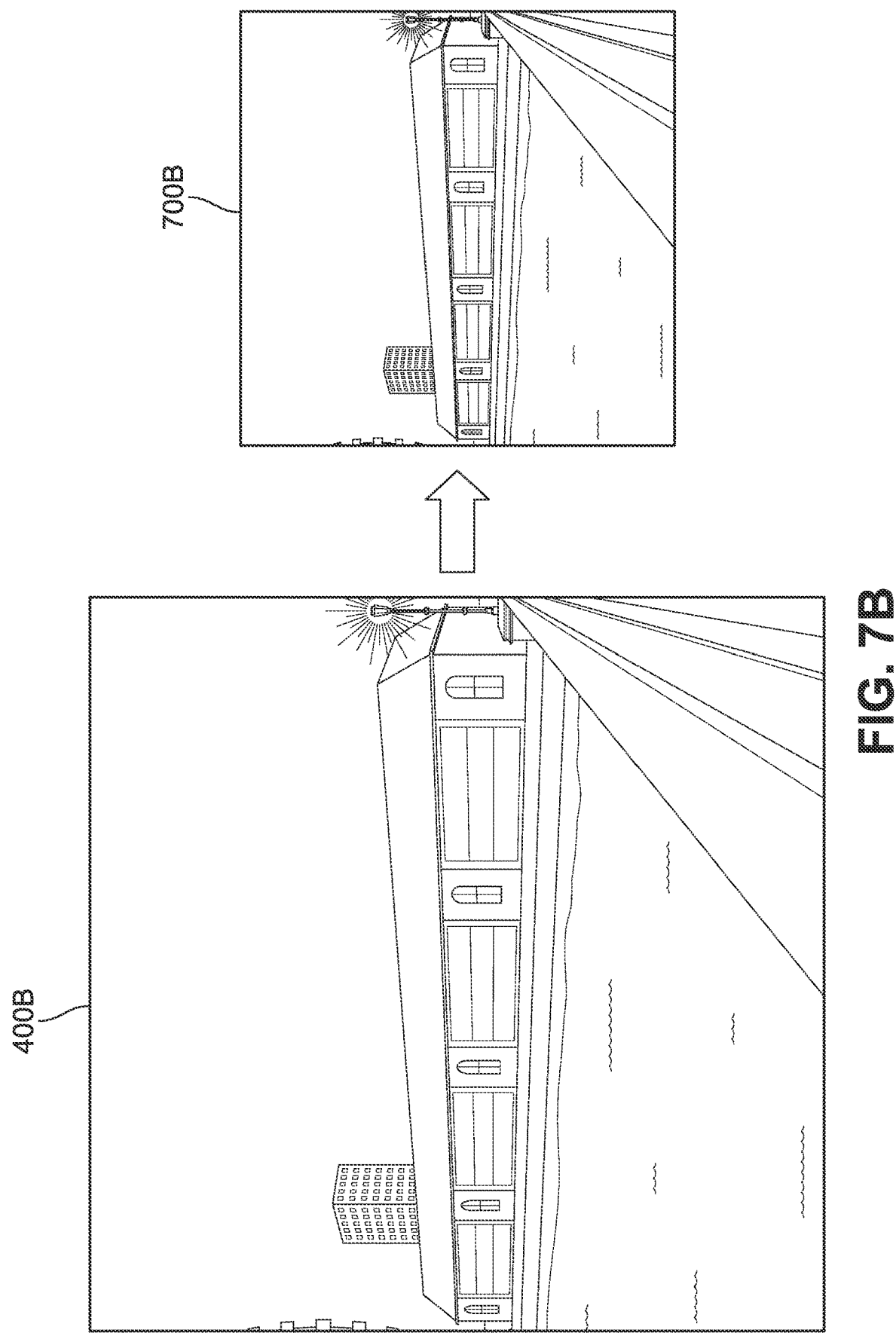
Figure 8:
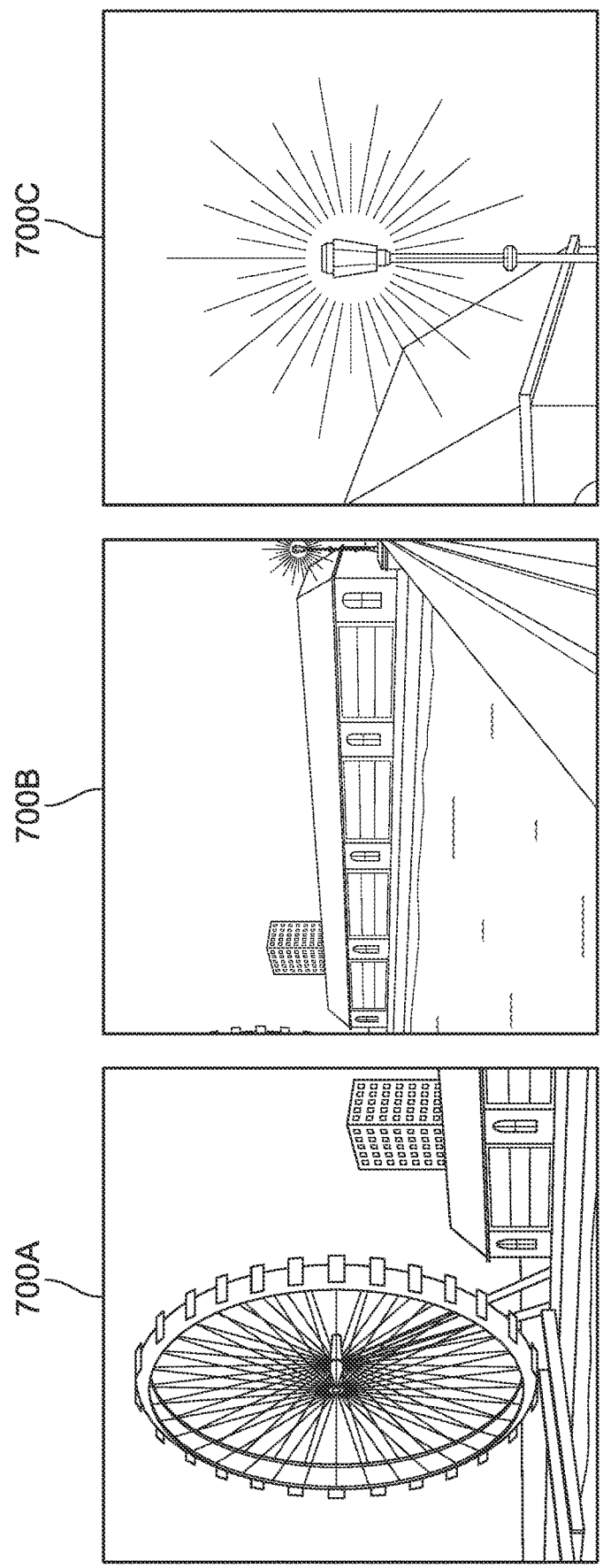
FIG. 8 illustrates the plurality of regional proposal images.

Once the candidate regions 400 are selected from the source image 200, the system 100 may modify the candidate regions to generate a plurality of regional proposal images (RPIs). The RPIs may be generated by, for example, resizing, cropping or warping at least some of the candidate regions 400 or adding a new region to at least some of the candidate regions 400 such that the corresponding RPIs 700 may have the target image configuration, for example, 600 pixels by 600 pixels as shown in FIG. 3B. For example, as shown in FIG. 7A, the candidate region 400A may have the target image configuration, requiring no modification to the image configuration. In such case, the system 100 may not perform any modification to the image configuration. Instead, the system 100 may perform image enhancement on the candidate region 400 such that the corresponding RPI becomes more visually effective. For example, the system 100 may adjust a brightness, contrast, color, sharpness, etc. to visually enhance the candidate region 400A. Other RPIs 700 having an image configuration different from the target image configuration may be modified by, for example, resizing, cropping, warping, and/or the like. For example, in FIG. 7B, the RPI 400B that is larger than the target image 300 may be resized or reduced to have the same size as the target image 300. Also, in FIG. 7C, the RPI 400C that is smaller than the target image 300 may be resized or enlarged to have the same size as the target image 300. As such, as shown in FIG. 8, the system 100 may generate a number of RPIs 700, such as the RPIs 700A, 700B and 700C, that have the same image configuration as the target image configuration of the target image 300.

Figure 9:
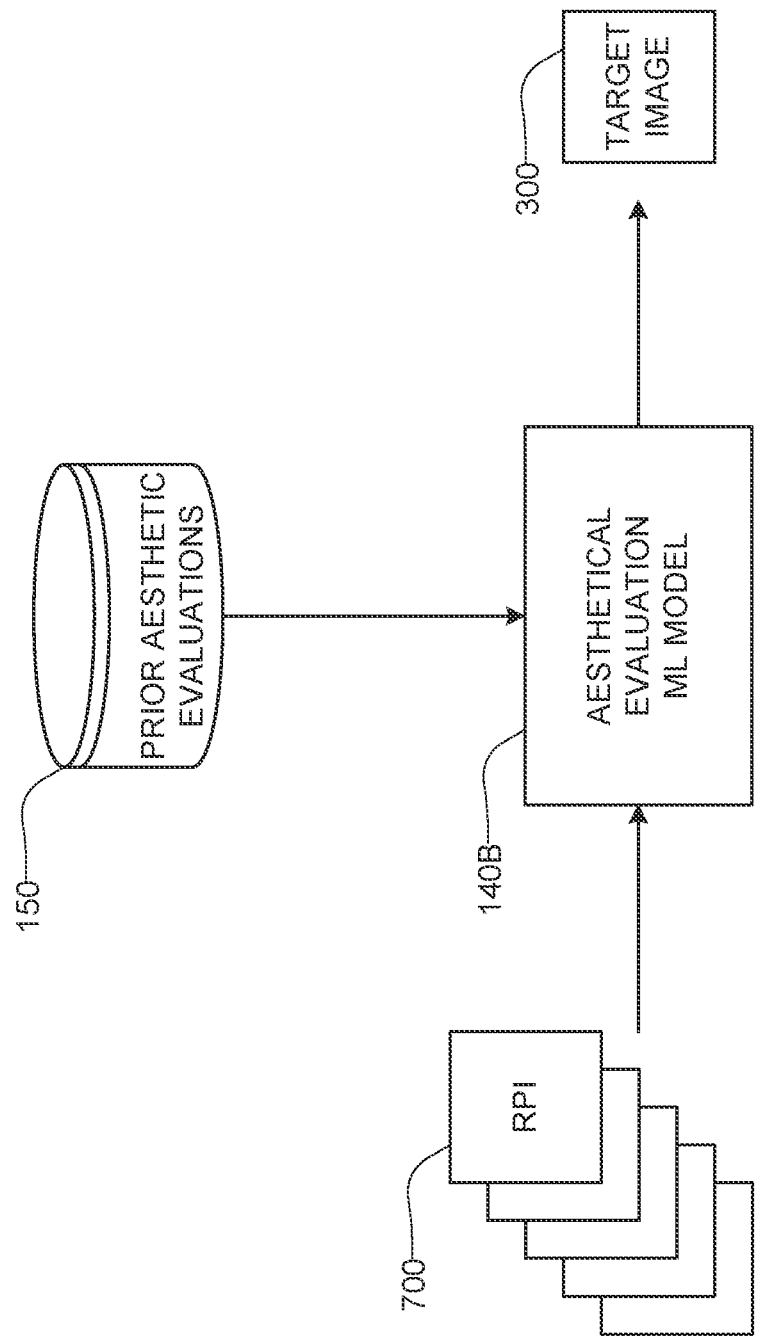
FIG. 9 illustrates example operations of an aesthetical evaluation ML model.

The system 100 may then determine an aesthetical value of each RPI 700. In an implementation, such aesthetical value may be determined by the aesthetical evaluation ML model 140B (hereinafter "evaluation model 140B"). FIG. 9 illustrates example operations of the evaluation model 140B, which may receive the RPIs 700 and determine an aesthetical value of each received RPIs 700 based on the prior aesthetical evaluation data stored in the data storage 150B. The prior aesthetical evaluation data may include a plurality of prior user aesthetical evaluation values (e.g., grade, score, etc.) of a plurality of sample images having different visual features and configurations. For example, a large number of evaluation scores or grades on a plurality of sample images may be collected. The sample images may have different visual features and image configuration. Some of the sample images may show similar features but may have different image configurations. Some of the sample images may have similar image configuration and show a similar feature positioned at different portions of on the sample images. The prior aesthetical evaluation data may include the visual features and image configuration of each sample image and evaluation values (e.g., evaluation scores or grades) on each sample image collected from a group of evaluators.

The evaluation model 140B may then be trained with the prior aesthetical evaluation data to identify patterns or correlations between various visual features and/or image configurations of the sample images and the evaluation values of the sample images. Based on the identified pattern or correlations, the evaluation model 140B may then determine an aesthetical value of each RPI 700. For example, the evaluation model 140B may identify, from the prior aesthetical evaluation data, that the sample images prominently showing a flare or bright light at the center have received low average evaluation values (e.g., average 30 points out of 100). On this basis, the evaluation model 140B may determine that the RPI 700C (shown in FIG. 8) should have a low aesthetical value (e.g., 30 points). The evaluation model 140B may also identify, from the prior aesthetical evaluation data, that the sample images incompletely showing an object have received mixed evaluation values (e.g., average points out of 100). On this basis, the evaluation model 140B may determine that, in the RPI 700B, an object (i.e., carnival ride) positioned on the left is not completely shown, and then determine that the RPI 700B (shown in FIG. 8) should have an average aesthetical value (e.g., 50 points). The evaluation model 140B may further identify, from the prior aesthetical evaluation data, that the sample images showing amusement park rides have been evaluated highly (e.g., average 85 points out of 100). The evaluation model 140B may then determine that the RPI 700A (shown in FIG. 8) should be given a high aesthetical value (e.g., 85 points).

Upon determining the aesthetical value of each RPI 700, the system 100 may rank the RPI 700 based on the aesthetical value, and select one of the RPIs 700 having the highest aesthetical value (e.g., RPI 700A having the aesthetical value of 85 points) as the target image 300. The target image 300 may then be extracted from the evaluation model 140B, and the system 100 may cause the target image 300 to be displayed via the display 114 of the local device 110.

As such, this description allows to automatically generate, from a source image, a number of different variations having different sizes and shapes while maintaining the same or similar aesthetical value or visual effectiveness. Therefore, this description provides a technical solution to the technical problems that aesthetically pleasing modifications of a source image cannot be automatically generated even with a state-of-art machine unless human intelligence, training, skill and efforts are involved.

Figure 10:
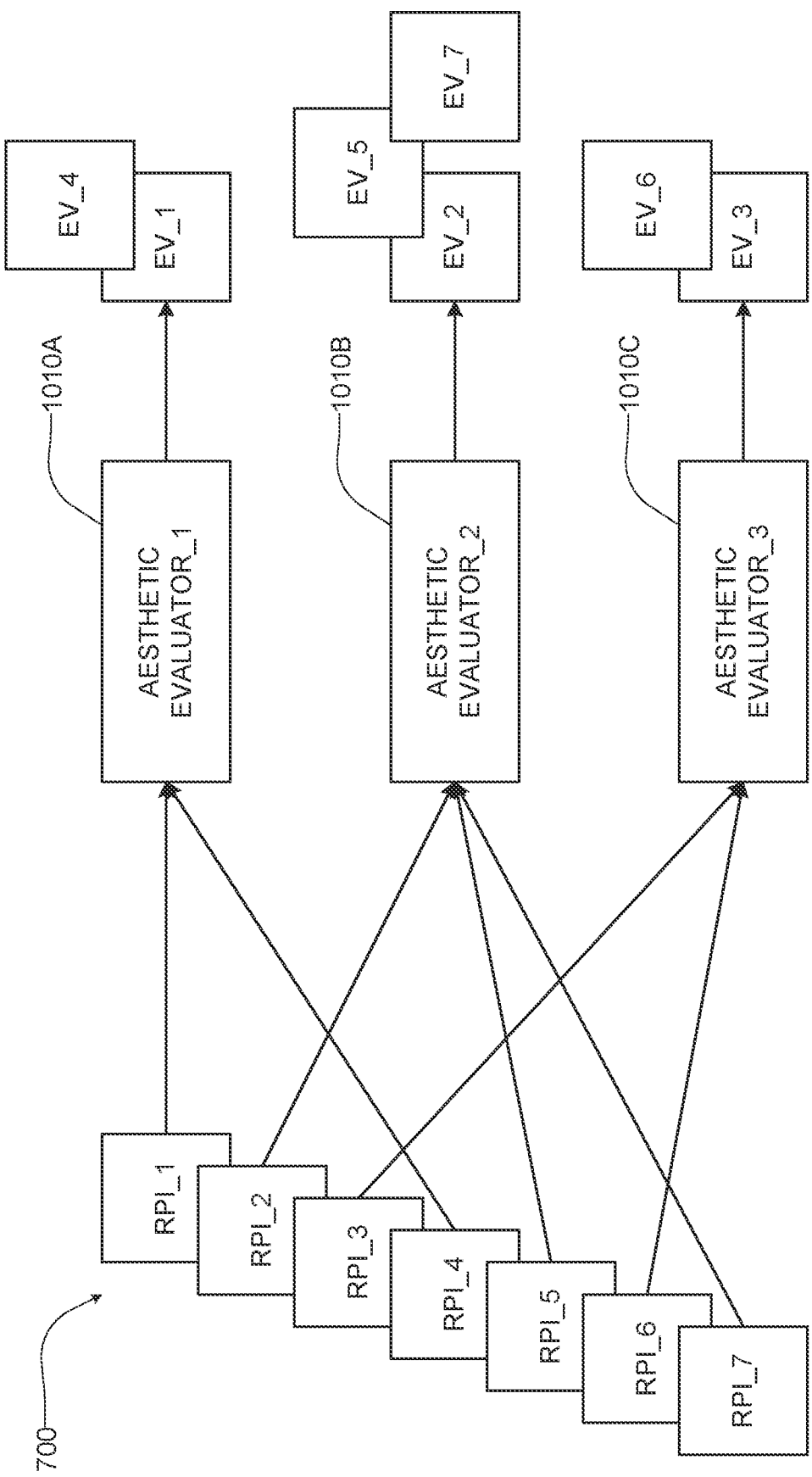
FIG. 10 illustrates example parallel aesthetic evaluation operations of the aesthetical evaluation ML model.

Such target image 300 may need to be provided to the user as quickly as possible so that the user can use the target image 300 without waiting too long. However, when a large number of RPIs 700 are generated, it may take a long time for the system 100 to complete determining the aesthetical values of all the RPIs 700. Hence, the system 100 may be configured to determine the aesthetical values of the RPIs 700 in a parallel manner. For example, as shown in FIG. 10, the evaluation model 140B may operate a plurality of aesthetical evaluators, for example, first to third aesthetical evaluators 1010A, 1010B and 1010C, which are configured to operate simultaneously in parallel. When a plurality of RPIs 700, for example, first to seventh RPIs RPI_1, RPI_2, RPI_3, RPI_4, RPI_5, RPI_6 and RPI_7, are generated, the first to third RPIs RPI_1, RPI_2 and RPI_3 may be provided to the first to third aesthetical evaluators 1010A, 1010B and 1010C, respectively, such that the third aesthetical evaluators 1010A, 1010B and 1010C can simultaneously process the first to third RPIs RPI_1, RPI_2 and RPI_3 in parallel, and generate first to third evaluation values EV_1, EV_2 and EV_3 of the first to third RPIs RPI_1, RPI_2 and RPI_3, respectively. Then, the fourth to sixth RPIs RPI_4, RPI_5 and RPI_6 may be provided to and processed by the first to third aesthetical evaluators 1010A, 1010B and 1010C, respectively, to generate fourth to sixth evaluation values EV_4, EV_5 and EV_6 of the fourth to sixth RPIs RPI_4, RPI_5 and RPI_6, respectively. One of the aesthetical evaluators 1010A, 1010B and 1010C may complete the evaluation sooner than the others. For example, the second aesthetical evaluators 1010B may complete the evaluation of the fifth RPI RPI_5 while the first and third evaluators 1010A and 1010C are still processing the fourth and sixth RPI RPI_4 and RPI_6. In such case, the next RPI in the queue, for example, the seventh RPI RPI_7 may be provided to the second aesthetical evaluators 1010B, which may in turn generate a seventh evaluation value EV_7. As such, even when a large number of RPIs 700 are generated, the evaluation model 140B may be able to significantly reduce the time that takes to evaluate all of the RPIs 700, which may also reduce to selecting and providing the target image 300 to the user.

Figure 11:
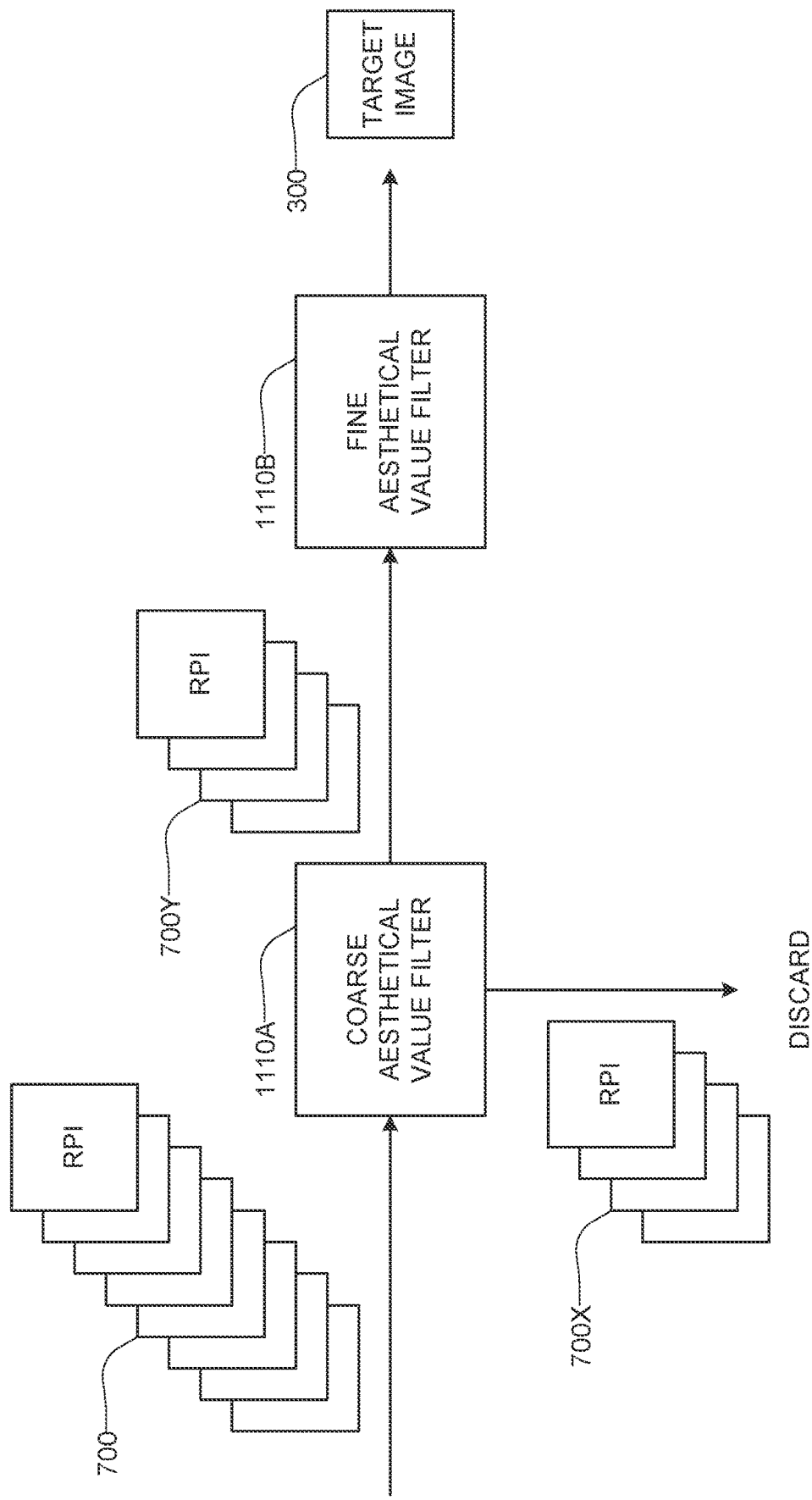
FIG. 11 illustrates example two-step coarse and fine aesthetic evaluation operations of the aesthetical evaluation ML model.

Additionally, or alternatively, the system 100 may configured to filter out some of the RPIs 700 having a feature or features that negatively impact the aesthetical value thereof and are easily detectable. The remaining RPIs 700 may then be processed to generate their aesthetical values, or may be filtered again more thoroughly before their aesthetical values are determined. For example, as shown in FIG. 11, the evaluation model 140B may include one or more aesthetical value filters, such as first and second aesthetical value filters 1110A and 1110B, etc. The first aesthetical value filter 1110A may be a coarse aesthetical value filter (hereinafter "first filter 1110A"). The first filter 1110A may be configured to detect a feature or features in each RPI 700 that may be easy to detect and negatively impact the aesthetical value. For example, the first filter 1110A may be configured to determine whether each RPI 700 prominently shows a flare or bight light, which may be relatively easily detected based on an overall image brightness, and categorize such RPIs as failed RPIs 700X, which may be eliminated or discarded. The remaining RPIs 700 are categorized as passed RPIs 700Y and provided to the second aesthetical value filter 1110B (hereinafter "second filter 1110B"), which may be a fine aesthetical value filter. The second filter 1110B may process each of the passed RPI 700Y to perform a full-scale detailed aesthetical evaluation and determine the aesthetical values of the passed RPIs 700Y. Hence, the evaluation model 140B may not need to perform the full-scale detailed aesthetical evaluation on all of the RPIs 700, which may significantly reduce the time to provide the target image 300 to the user.

Figure 12A:
FIGS. 12A and 12B illustrate another example source image and example target image, respectively.
Figure 12B:
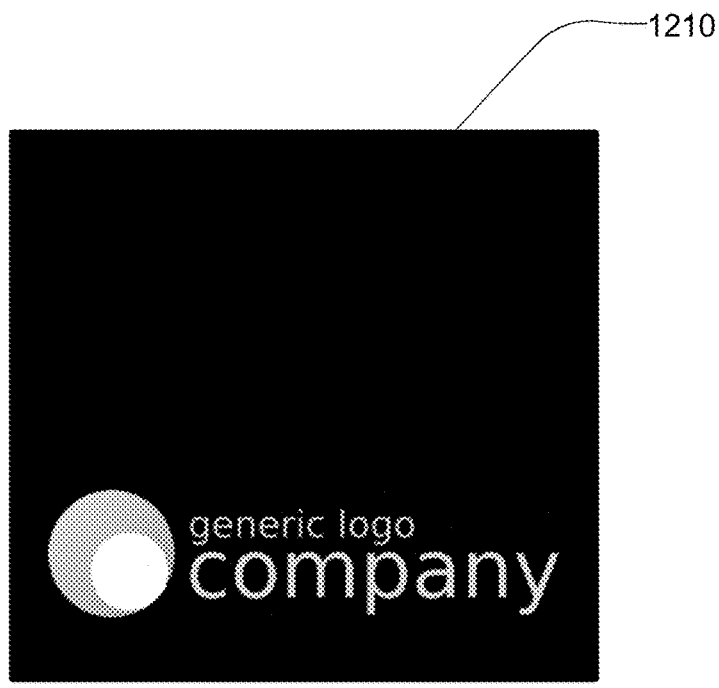

FIG. 12A illustrates another example source image 1200, which is a company logo having an elongated rectangular shape, of which the width is substantially greater than the height. When such shaped source image 1200 needs to be modified to have a substantially different image configuration, such as a rectangular shaped image having a height and width that are substantially the same, it would be difficult or impossible to generate an aesthetically pleasing target image regardless of how the source image 1200 is resized, cropped or warped. In such case, the system 100 may be configured to analyze the source image 1200 and determine that the source image 120 has a logo and text on a dark background. Then, based on the set of rules, the system 100 may determine that a solution to retain the aesthetical value or minimize any loss to the aesthetical value is to generate a new portion having the same color as the background and add the new portion to the source image 1200 because such modification does not alter an aspect ratio of the logo and text in the source image 1200. Then, as shown in FIG. 12B, the system 100 may generate a target image 1210 having a substantially square shape having the dark background color, in which the logo and text are located at the bottom thereof. As such, this description provides a technical solution to the technical problem that some images cannot be modified to have a drastically different configuration without a significant loss in the aesthetical value.

Figure 13:
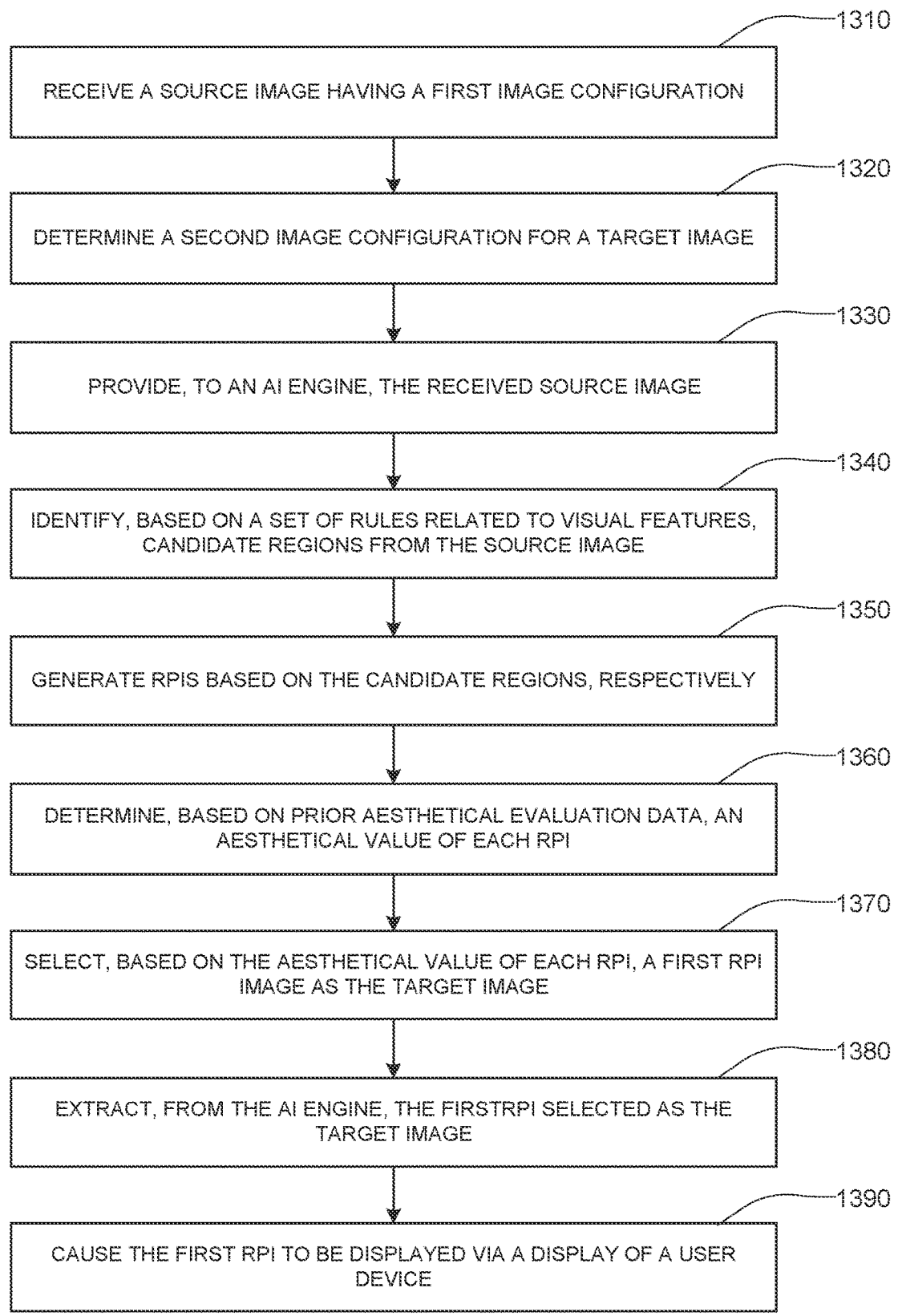
FIG. 13 is a flow diagram showing example operations by the system to modify a source image to generate a target image.

FIG. 13 is a flow diagram showing example operations by the system 100 to modify a source image to have a different image configuration while retaining or improving an aesthetical value or minimizing any loss to the aesthetical value.

At step 1310, the system 100 may receive the source image 200 having a first image configuration. At step 1320, the system 100 may determine a second image configuration for a target image. At step 1330, the system 100 may provide, to the AI engine 130, the received source image 200. The AI engine 130 may include or be in communication with the selection model 140A, evaluation model 140B, etc. At step 1340, the AI engine 130 may identify, based on a set of rules related to visual features, a plurality of candidate regions 400 from the source image 200. Each candidate region 400 may show a different portion of the source image 200. At step 1350, the AI engine 130 may generate a plurality of RPIs 700 based on the identified candidate regions 400, respectively. Each of the RPIs 700 may have the second image configuration. At step 1360, the AI engine 130 may determine, based on prior aesthetical evaluation data, an aesthetical value of each of the RPIs 700. At step 1370, the system 100 may select, based on the determined aesthetical value of each RPI 700, a first regional proposal image, which is one of the plurality of RPI 700, as the target image 300. At step 1380, the system 100 may extract, from the AI engine 130, the first RPI selected as the target image 300. At step 1380, the system 100 may then cause the first regional proposal image to be displayed via the display 114 of the local user device 110.

As such, this description allows to automatically generate, from a source image, a number of different modifications, each of which meets size and shape requirements or restrictions by each different platform or service while maintaining the same or similar aesthetical value or visual effectiveness. Therefore, this description provides a technical solution to the technical problems that various aesthetically pleasing modifications of a source image cannot be generated even with a state-of-art machine unless human intelligence, training, skill and efforts are involved.

Figure 14:
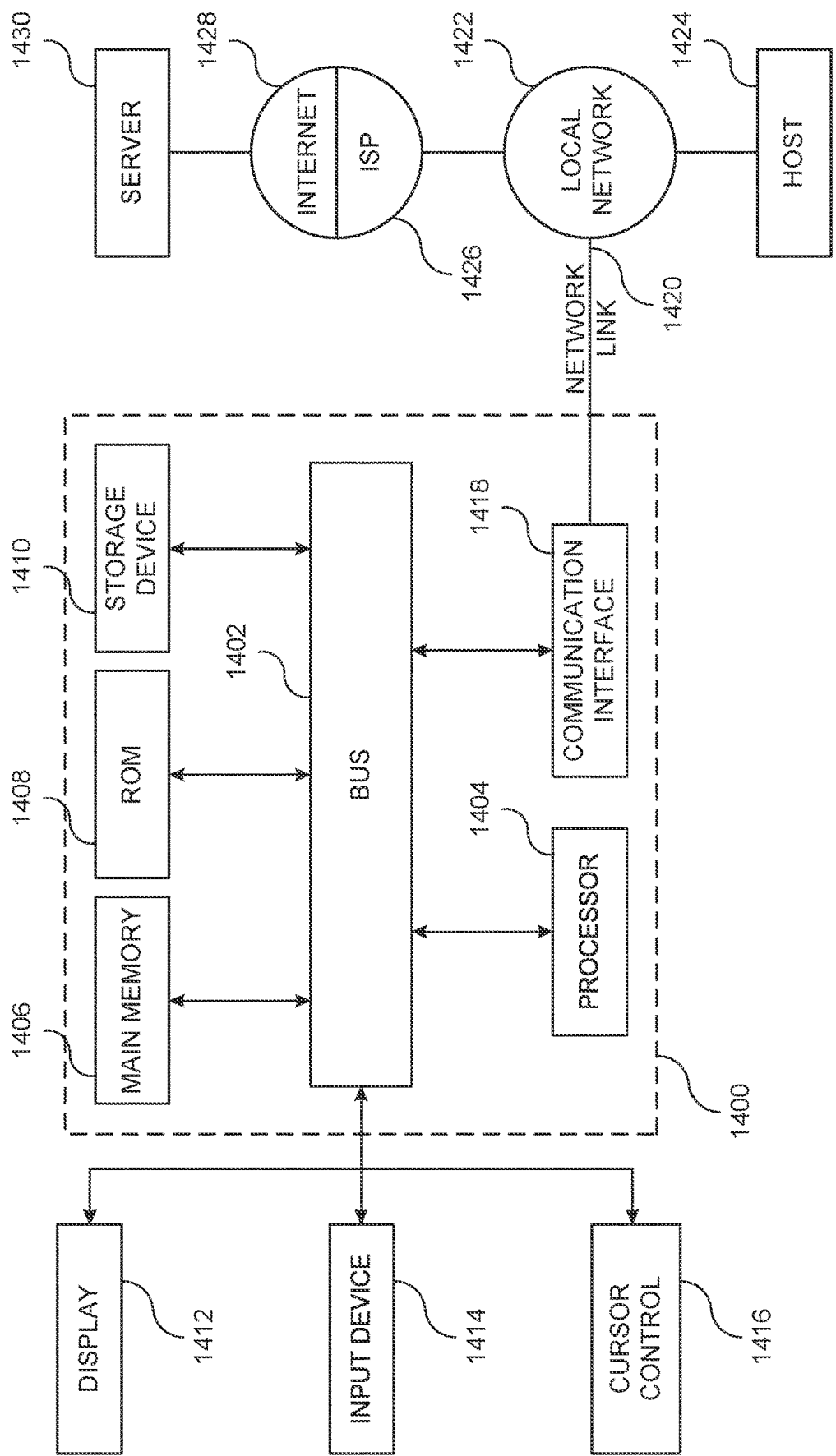
FIG. 14 is a block diagram showing an example computer system upon which aspects of this disclosure may be implemented.

FIG. 14 is a block diagram showing an example a computer system 1400 upon which aspects of this disclosure may be implemented. The computer system 1400 may include a bus 1402 or other communication mechanism for communicating information, and a processor 1404 coupled with the bus 1402 for processing information. The computer system 1400 may also include a main memory 1406, such as a random-access memory (RAM) or other dynamic storage device, coupled to the bus 1402 for storing information and instructions to be executed by the processor 1404. The main memory 1406 may also be used for storing temporary variables or other intermediate information during execution of instructions to be executed by the processor 1404. The computer system 1400 may implement, for example, the local device 110, server 120, AI engine 130, selection model 140, evaluation model 150, and/or the like.

The computer system 1400 may further include a read only memory (ROM) 1408 or other static storage device coupled to the bus 1402 for storing static information and instructions for the processor 1404. A storage device 1410, such as a flash or other non-volatile memory may be coupled to the bus 1402 for storing information and instructions.

The computer system 1400 may be coupled via the bus 1402 to a display 1412, such as a liquid crystal display (LCD), for displaying information. One or more user input devices, such as the example user input device 1414 may be coupled to the bus 1402, and may be configured for receiving various user inputs, such as user command selections and communicating these to the processor 1404, or to the main memory 1406. The user input device 1414 may include physical structure, or virtual implementation, or both, providing user input modes or options, for controlling, for example, a cursor, visible to a user through display 1412 or through other techniques, and such modes or operations may include, for example virtual mouse, trackball, or cursor direction keys.

The computer system 1400 may include respective resources of the processor 1404 executing, in an overlapping or interleaved manner, respective program instructions. Instructions may be read into the main memory 1406 from another machine-readable medium, such as the storage device 1410. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1410. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1400 may also include a communication interface 1418 coupled to the bus 1402, for two-way data communication coupling to a network link 1420 connected to a local network 1422. The network link 1420 may provide data communication through one or more networks to other data devices. For example, the network link 1420 may provide a connection through the local network 1422 to a host computer 1424 or to data equipment operated by an Internet Service Provider (ISP) 1426 to access through the Internet 1428 a server 1430, for example, to obtain code for an application program.

In the following, further features, characteristics and advantages of the invention will be described by means of items:

Item 1. A system for modifying an image, including a processor and a computer-readable medium in communication with the processor, the computer-readable medium including instructions that, when executed by the processor, cause the processor to control the system to perform functions of receiving a source image having a first image configuration; determining a second image configuration for a target image; providing, to an artificial intelligence (AI) engine, the received source image, the AI engine trained to perform functions of: identifying, based on a set of rules related to visual features, a plurality of candidate regions from the source image, each candidate region showing a different portion of the source image; generating a plurality of regional proposal images based on the plurality of identified candidate regions, respectively, wherein each proposal region image has the second image configuration; determining, based on prior aesthetical evaluation data, an aesthetical value of each regional proposal image; and selecting, based on the determined aesthetical value of each regional proposal image, a first regional proposal image as the target image, the first region proposal image being one of the plurality of regional proposal images; extracting, from the AI engine, the first regional proposal image selected as the target image; and causing the first regional proposal image to be displayed via a display of a user device.

Item 2. The system of Item 1, wherein the first image configuration includes a first image height and a first image width, the second image configuration include a second image height and a second image width, and at least one of the first image height and width is different from at least one of the second image height and width.

Item 3. The system of Item 1, wherein, for generating the plurality of regional proposal images, the AI engine is further trained to perform modifying a size or shape of at least some of the identified candidate regions.

Item 4. The system of Item 3, wherein, for modifying the size or shape of at least some of the identified candidate regions, the AI engine is further trained to perform resizing, cropping or warping at least some of the candidate regions; or adding a new region to at least some of the candidate regions.

Item 5. The system of Item 1, wherein the AI engine includes a first machine learning (ML) model trained to perform identifying, from the source image, the plurality of candidate regions based on the set of rules related to the visual features.

Item 6. The system of Item 5, wherein the set of rules related to the visual features includes at least one of the second image configuration for the target image; an aspect ratio or shape of the source image or target image; a location of text in the source image; a location of a logo in the source image; a location of a specific body part in the source image; a visibility tolerance; and a clarity or distortion tolerance.

Item 7. The system of Item 5, wherein the AI engine further includes a second ML model trained to perform determining, based on the prior aesthetical evaluation data, the aesthetical value of each regional proposal image.

Item 8. The system of Item 7, wherein the prior aesthetical evaluation data includes a plurality of prior user aesthetical evaluations of a plurality of sample images having different visual features and configurations.

Item 9. The system of Item 7, wherein, for determining the aesthetical value of each regional proposal image, the second ML model is configured to perform a function of processing, using a plurality of computing devices, the plurality of regional proposal images in parallel.

Item 10. The system of Item 7, wherein, for determining the aesthetical value of each regional proposal image, the second ML model is configured to perform functions of determining, based on a set of coarse aesthetic selection rules, a first aesthetical evaluation value of each regional proposal image; identifying a set of the regional proposal images having the first aesthetical evaluation value higher than a predetermined value; determining, based on a set of fine aesthetic selection rules, a second aesthetical evaluation value of each included in the identified set of the regional proposal images; determining that the first regional proposal image has a highest second aesthetical evaluation value; and selecting the first regional proposal image as the target image.

Item 11. A method of operating a system for modifying an image, including receiving a source image having a first image configuration; determining a second image configuration for a target image; providing, to an artificial intelligence (AI) engine, the received source image, the AI engine trained to perform functions of: identifying, based on a set of rules related to visual features, a plurality of candidate regions from the source image, each candidate region showing a different portion of the source image; generating a plurality of regional proposal images based on the plurality of identified candidate regions, respectively, wherein each proposal region image has the second image configuration; determining, based on prior aesthetical evaluation data, an aesthetical value of each regional proposal image; and selecting, based on the determined aesthetical value of each regional proposal image, a first regional proposal image as the target image, the first region proposal image being one of the plurality of regional proposal images; extracting, from the AI engine, the first regional proposal image selected as the target image; and causing the first regional proposal image to be displayed via a display of a user device.

Item 12. The method of Item 11, wherein the first image configuration includes a first image height and a first image width, the second image configuration includes a second image height and a second image width, and at least one of the first image height and width is different from at least one of the second image height and width.

Item 13. The method of Item 11, wherein generating the plurality of regional proposal images includes modifying a size or shape of at least some of the identified candidate regions.

Item 14. The method of Item 13, wherein modifying the size or shape of at least some of the identified candidate regions includes resizing, cropping or warping at least some of the candidate regions; or adding a new region to at least some of the candidate regions.

Item 15. The method of Item 11, wherein the AI engine includes a first machine learning (ML) model trained to perform identifying, from the source image, the plurality of candidate regions based on the set of rules related to the visual features.

Item 16. The method of Item 15, wherein the set of rules related to the visual features includes at least one of the second image configuration for the target image; an aspect ratio or shape of the source image or target image; a location of text in the source image; a location of a logo in the source image; a location of a specific body part in the source image; a visibility tolerance; and a clarity or distortion tolerance.

Item 17. The method of Item 15, wherein the AI engine further includes a second ML model trained to perform determining, based on the prior aesthetical evaluation data, the aesthetical value of each regional proposal image.

Item 18. The method of Item 17, wherein the prior aesthetical evaluation data includes a plurality of prior user aesthetical evaluations of a plurality of sample images having different visual features and configurations.

Item 19. The method of Item 17, wherein, for determining the aesthetical value of each regional proposal image, the second ML model is configured to perform a function of processing, using a plurality of computing devices, the plurality of regional proposal images in parallel; or perform functions of determining, based on a set of coarse aesthetic selection rules, a first aesthetical evaluation value of each regional proposal image; identifying a set of the regional proposal images having the first aesthetical evaluation value higher than a predetermined value; determining, based on a set of fine aesthetic selection rules, a second aesthetical evaluation value of each included in the identified set of the regional proposal images; determining that the first regional proposal image has a highest second aesthetical evaluation value; and selecting the first regional proposal image as the target image.

Item 20. A non-transitory computer-readable medium including instructions that, when executed by a processor, cause the processor to control a system to perform receiving a source image having a first image configuration; determining a second image configuration for a target image; providing, to an artificial intelligence (AI) engine, the received source image, the AI engine trained to perform functions of identifying, based on a set of rules related to visual features, a plurality of candidate regions from the source image, each candidate region showing a different portion of the source image; generating a plurality of regional proposal images based on the plurality of identified candidate regions, respectively, wherein each proposal region image has the second image configuration; determining, based on prior aesthetical evaluation data, an aesthetical value of each regional proposal image; and selecting, based on the determined aesthetical value of each regional proposal image, a first regional proposal image as the target image, the first region proposal image being one of the plurality of regional proposal images; extracting, from the AI engine, the first regional proposal image selected as the target image; and causing the first regional proposal image to be displayed via a display of a user device.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for modifying an image, comprising:
a processor; and
a computer-readable medium in communication with the processor, the computer-readable medium comprising instructions that, when executed by the processor, cause the processor to control the system to perform functions of:

receiving a source image having a first image configuration;

determining a second image configuration for a target image;

providing, to an artificial intelligence (AI) engine, the received source image, the AI engine trained to perform functions of:

identifying, based on a set of rules related to visual features, a plurality of candidate regions from the source image, each candidate region showing a different portion of the source image;

generating a plurality of regional proposal images based on the plurality of identified candidate regions, respectively, wherein each proposal region image has the second image configuration;

determining, based on prior aesthetical evaluation data, an aesthetical value of each regional proposal image; and selecting, based on the determined aesthetical value of each regional proposal image, a first regional proposal image as the target image, the first region proposal image being one of the plurality of regional proposal images;

extracting, from the AI engine, the first regional proposal image selected as the target image; and causing the first regional proposal image to be displayed via a display of a user device.

2. The system of claim 1, wherein:

the first image configuration includes a first image height and a first image width, the second image configuration include a second image height and a second image width, and at least one of the first image height and width is different from at least one of the second image height and width.

3. The system of claim 1, wherein, for generating the plurality of regional proposal images, the AI engine is further trained to perform modifying a size or shape of at least some of the identified candidate regions.

4. The system of claim 3, wherein, for modifying the size or shape of at least some of the identified candidate regions, the AI engine is further trained to perform:

resizing, cropping or warping at least some of the candidate regions; or adding a new region to at least some of the candidate regions.

5. The system of claim 1, wherein the AI engine comprises a first machine learning (ML) model trained to perform identifying, from the source image, the plurality of candidate regions based on the set of rules related to the visual features.

6. The system of claim 5, wherein the set of rules related to the visual features includes at least one of:

the second image configuration for the target image;

an aspect ratio or shape of the source image or target image;

a location of text in the source image;

a location of a logo in the source image;

a location of a specific body part in the source image;

a visibility tolerance; and a clarity or distortion tolerance.

7. The system of claim 5, wherein the AI engine further comprises a second ML model trained to perform determining, based on the prior aesthetical evaluation data, the aesthetical value of each regional proposal image.

8. The system of claim 7, wherein the prior aesthetical evaluation data comprises a plurality of prior user aesthetical evaluations of a plurality of sample images having different visual features and configurations.

9. The system of claim 7, wherein, for determining the aesthetical value of each regional proposal image, the second ML model is configured to perform a function of processing, using a plurality of computing devices, the plurality of regional proposal images in parallel.

10. The system of claim 7, wherein, for determining the aesthetical value of each regional proposal image, the second ML model is configured to perform functions of:

determining, based on a set of coarse aesthetic selection rules, a first aesthetical evaluation value of each regional proposal image;

identifying a set of the regional proposal images having the first aesthetical evaluation value higher than a predetermined value;

determining, based on a set of fine aesthetic selection rules, a second aesthetical evaluation value of each included in the identified set of the regional proposal images;

determining that the first regional proposal image has a highest second aesthetical evaluation value; and selecting the first regional proposal image as the target image.

11. A method of operating a system for modifying an image, comprising:

receiving a source image having a first image configuration;

determining a second image configuration for a target image;

providing, to an artificial intelligence (AI) engine, the received source image, the AI engine trained to perform functions of:

identifying, based on a set of rules related to visual features, a plurality of candidate regions from the source image, each candidate region showing a different portion of the source image;

generating a plurality of regional proposal images based on the plurality of identified candidate regions, respectively, wherein each proposal region image has the second image configuration;

determining, based on prior aesthetical evaluation data, an aesthetical value of each regional proposal image; and selecting, based on the determined aesthetical value of each regional proposal image, a first regional proposal image as the target image, the first region proposal image being one of the plurality of regional proposal images;

extracting, from the AI engine, the first regional proposal image selected as the target image; and causing the first regional proposal image to be displayed via a display of a user device.

12. The method of claim 11, wherein:

the first image configuration includes a first image height and a first image width, the second image configuration includes a second image height and a second image width, and at least one of the first image height and width is different from at least one of the second image height and width.

13. The method of claim 11, wherein generating the plurality of regional proposal images includes modifying a size or shape of at least some of the identified candidate regions.

14. The method of claim 13, wherein modifying the size or shape of at least some of the identified candidate regions includes:

resizing, cropping or warping at least some of the candidate regions; or adding a new region to at least some of the candidate regions.

15. The method of claim 11, wherein the AI engine comprises a first machine learning (ML) model trained to perform identifying, from the source image, the plurality of candidate regions based on the set of rules related to the visual features.

16. The method of claim 15, wherein the set of rules related to the visual features includes at least one of:
   the second image configuration for the target image;
   an aspect ratio or shape of the source image or target image;
   a location of text in the source image;
   a location of a logo in the source image;
   a location of a specific body part in the source image;
   a visibility tolerance; and
   a clarity or distortion tolerance.

17. The method of claim 15, wherein the AI engine further comprises a second ML model trained to perform determining, based on the prior aesthetical evaluation data, the aesthetical value of each regional proposal image.

18. The method of claim 17, wherein the prior aesthetical evaluation data comprises a plurality of prior user aesthetical evaluations of a plurality of sample images having different visual features and configurations.

19. The method of claim 17, wherein, for determining the aesthetical value of each regional proposal image, the second ML model is configured to:
   perform a function of processing, using a plurality of computing devices, the plurality of regional proposal images in parallel; or
   perform functions of:
   determining, based on a set of coarse aesthetic selection rules, a first aesthetical evaluation value of each regional proposal image;
   identifying a set of the regional proposal images having the first aesthetical evaluation value higher than a predetermined value;
   determining, based on a set of fine aesthetic selection rules, a second aesthetical evaluation value of each included in the identified set of the regional proposal images;
   determining that the first regional proposal image has a highest second aesthetical evaluation value; and
   selecting the first regional proposal image as the target image.

20. A non-transitory computer-readable medium comprising instructions that, when executed by a processor, cause the processor to control a system to perform:
   receiving a source image having a first image configuration;
   determining a second image configuration for a target image;
   providing, to an artificial intelligence (AI) engine, the received source image, the AI engine trained to perform functions of:
   identifying, based on a set of rules related to visual features, a plurality of candidate regions from the source image, each candidate region showing a different portion of the source image;
   generating a plurality of regional proposal images based on the plurality of identified candidate regions, respectively, wherein each proposal region image has the second image configuration;
   determining, based on prior aesthetical evaluation data, an aesthetical value of each regional proposal image; and
   selecting, based on the determined aesthetical value of each regional proposal image, a first regional proposal image as the target image, the first region proposal image being one of the plurality of regional proposal images;
   extracting, from the AI engine, the first regional proposal image selected as the target image; and
   causing the first regional proposal image to be displayed via a display of a user device.

* * * * *